United States Patent Office 3,639,441
Patented Feb. 1, 1972

3,639,441
PENTAERYTHRITOL-DI- AND TETRA-PIVALOYL-DIORTHOSILICIC ACID-HEXA-ALKYL ESTERS
Hans Feichtinger, Dinslaken, and Herbert Gothel, Oberhausen-Holten, Germany, assignors to Ruhrchemie Aktiengesellschaft, Oberhausen-Holten, Germany
No Drawing. Filed Oct. 2, 1969, Ser. No. 863,315
Claims priority, application Germany, Oct. 3, 1968, P 18 00 875.8
Int. Cl. C07f 7/09
U.S. Cl. 260—448.8 R                5 Claims

ABSTRACT OF THE DISCLOSURE

Diorthosilicic acid esters of the formula:

$$A(OSi)_2(OR')_6$$

wherein A is a monopentaerythritol-dicarboxylic acid ester or a dipentaerythritol-tetra-carboxylic acid ester which acid has a quaternary carbon atom therein and R' is an alkyl group of more than 3, preferably at least 8, carbon atoms; and lubricants containing such.

---

U.S. Pat. 3,444,081 relates to diorthosilicic acid esters of the formula $$A(OSi)_2(OR)_{6-(n+m)}(OR')_n(OR'')_m$$

wherein A represents a pentaerythritol-dicarboxylic-acid ester or di-pentaerythritol-tetra-carboxylic-acid ester radical, R represents a polyoxyalkyleneglycol ether radical having 1 to 4 ether-oxygen atoms, R' represents an alkyl group having more than three carbon atoms, R" represents a monopentaerythritol-tri-carboxylic-acid ester radical or a dipentaerythritol-pentacarboxylic-acid ester radical, $n$ has a value of 0 to 6 and $m$ has a value of 0 to 2 and wherein the carboxylic acid constituents of the A- and R"-radicals are derived from saturated monocarboxylic acids having more than two carbon atoms and wherein R, R' and R" may be the same or different.

The said silicic acid esters may be used alone or admixed with other liquid materials, e.g., conventional fluid bodies suitable for use as lubricants as well as with the conventional fluid body additives, i.e., antioxidants, etc., and are especially well suited for the use in jet powered aircraft engines due to their outstanding high temperature behavior in combination with an adequate flowability at extremely low temperatures and a good lubricity over a broad temperature range. Furthermore, they don't suffer from the serious drawbacks inherent in other known diorthosilicic acid esters used as lubricants and lubricating additives, as for instance the splitting off of low boiling or other constituents under the influence of oxygen at elevated temperatures, the tendency to polymerize, and poor load carrying capacity of the lubricating films under various friction conditions.

It has now been found that diorthosilicic acid esters of the formula $$A(OSi)_2(OR')_6$$

wherein A represents a pentaerythritol-dicarboxylic-acid ester or a dipentaerythritol-tetracarboxylic-acid ester radical and R' represents at least one alkyl group having more than three carbon atoms, especially eight and more carbon atoms whereby the carboxylic acid constituents of the A-groups are derived from saturated monocarboxylic acids having more than two carbon atoms as defined in U.S. Pat. 3,444,081 possess especially high stability against the influence of heat and oxygen, provided the carboxylic acid components of the A-groups are derived from carboxylic acids containing quaternary carbon atoms or neocarbon atom structures, particularly quaternary α carbon atom structures.

Especially well suited are diorthosilicic acid esters as defined above wherein the carboxylic acid constituents of the A-groups are derived from pivalic acid.

Esters of such composition according to this invention are for instance:

(I) Pentaerythritol-di-pivaloyl-diorthosilicic acid-hexa-isodecyl-ester.

(II) Pentaerythritol-di - pivaloyl - diorthosilicic acid-hexa-isononyl-ester.

(III) Pentaerythritol-di - pivaloyl-diorthosilicic acid-hexa-isooctyl-ester.

The alkyl radicals of the said esters are preferably derived from alcohols obtained by the hydroformylation of n-1-heptene, n-1-octene and n-1-nonene.

The esters of this invention may be prepared by conventional methods employed for the production of diorthosilicic acid esters as known in the art, as, for instance, by reacting stoichiometric amounts of corresponding water-free alcohols and pentaerythritol hydroxyesters with gasous silicon tetrachloride as disclosed in German Pat. 1,142,855, or as disclosed in German patent application R 32 696 IVb/120, German Auslegeschrift 1,180,-359. The esters hereinbefore mentioned have been prepared in a so-called "bubble column reactor" and by following the process disclosed in German patent application R 32 696 IVb/120, German Auslegeschrift 1,180,359. Temperatures of 60 to 75° proved to be well suited for this reaction.

The diorthosilicic acid esters of this invention boil above 264° C. at 1 torr, above 210° at 0.01 torr and above 480° C. at 700 torr. Their flash points range above 260° C. They are characterized by high load carrying capacity of lubricating films containing such. These high boiling esters can be employed alone or admixed with other liquid materials, e.g., conventional fluid bodies suitable for use as lubricants as well as with conventional fluid body additives, i.e. antioxidants, as lubricants especially for supersonic jet powered aircraft engines. Depending on their viscosity, the esters according to the invention can be admixed in desired ratios with other compounds suitable for use as lubricants. They are preferably admixed with up to 75%, especially 20 to 75% of other lubricating substances, as, for instance, mineral lubricating oils, dicarboxylic acid esters, organo silicon compounds of various structures, polyphenyl ether oils and phosphoric acid esters. Due to their high thermal stability they are also especially well suited to use as heat transfer liquids as well as hydraulic liquids.

The advantages and properties of the novel diorthosilicic acid esters I, II and III are shown in the following table, wherein a comparison of these esters of this invention with certain similar diorthosilicic acid esters, having A-members derived from different pentaerythritol esters such as pentaerythritol-di-isobutyrate and pentaerythritol-di-isononanate, have been set out.

The esters to be compared with those according to the invention are (IV) Pentaerythritol-di-isobutyroyl - diorthosilicic acid-hexa-isodecyl-ester.

(V) Pentaerythritol-di-isobutyroyl - diorthosilicic acid-hexa-isooctyl-ester.

(VI) Pentaerythritol-di-isononanoyl-diorthosilicic acid-hexa-isodecyl-ester.

(VII) Pentaerythritol-di-isononanoyl-diorthosilicic acid-hexa-isononyl-ester.

The alkyl radicals of the esters IV to VII are derived from similar alcohols as those of the esters I to III.

The esters I, II and III possess lower viscosities, especially at low temperatures, lower setting points, more favorable characteristic numbers and evaporation values of the aging test in comparison to the esters IV, V, VI and VII, as is seen from this table.

The oxidation stability was determined by bubbling 5 liters of air per hour through 300 milliliters of the various ester oils, which contained 1% by weight phenothiazine as an oxidation inhibitor, at 200° C. for 32 hours. Besides the conventional data of the aged oils, e.g. change of the viscosity and of the acid content, the so-called evaporation value as well as the so-called characteristic number serve as criteria for the aging resistance. The evaporation value is expressed as the amount of the split off liquid products in percent of the charge, the characteristic number is a sum in milligrams of the carbon dioxide formed and of the content of organic acid in the condensed split off oxidation products.

EXAMPLE

A mixture of 836 g. (5.29 moles) decanol, obtained by hydroformylation of n-1-nonene followed by hydrogenation of the hydroformylation product and 243 g. (0.80 mole) pentaerythritol-di-pivalate was introduced into a reaction vessel having an internal diameter of 63 mm. and a height of 480 mm. The materials charged had previously been dried to a water content of about 0.04% by weight. 272 g. (1.60 moles) of silicon tetrachloride in vaporous form were successively sucked, under a vacuum of 180 torr through a glass frit provided at the lower end of the reaction vessel, into the reaction mixture. The ascending $SiCl_4$ vapors together with hydrogen chloride evolved during the reaction formed a bubble column within the liquid in the reaction vessel, which had previously been preheated to 48° C. The said bubble column was heated up to about 63° C. by the heat of the reaction. This temperature was maintained during a reaction period of 120 minutes. After termination of the reaction, hydrogen chloride was removed by introducing nitrogen in the reaction mixture at 110° C. and 20 torr. Thereafter, the non-reacted excess amounts of reactants (216 g.) were distilled off from the reaction product under a vacuum of 0.01 torr up to a temperature of 224° C. As distillation residue 905 g. (87% of the theoretical amount) of pentaerythritol-di-pivaloyl-di-orthosilicic acid-hexa-(isodecyl)-ester (ester I) which has a molecular weight of 1370 (calculated 1300) was obtained.

The other esters hereof were prepared in an entirely analogous manner.

TABLE

| | Ester | | | | | | |
|---|---|---|---|---|---|---|---|
| | IV | I | VI | II | VII | V | III |
| Molecular weight: | | | | | | | |
| Calculated | 1,272 | 1,300 | 1,412 | 1,216 | 1,328 | 1,104 | 1,132 |
| Determined | 1,210 | 1,370 | 1,360 | 1,180 | 1,250 | 1,060 | 1,070 |
| Viscosity in cst: | | | | | | | |
| At 98.9° C | 21.3 | 9.55 | 32 | 7.5 | 28 | 11.25 | 7.0 |
| At −40° C | 55,500 | 13,230 | 150,000 | 12,000 | 110,000 | 12,400 | 10,300 |
| Viscosity index | 150 | 150 | 146 | 151 | 145 | 152 | 154 |
| Setting point, ° C | −52 | −61 | −30 | −59 | −35 | −59 | −62 |
| Aging test: | | | | | | | |
| Characteristic number | 189 | 170 | 254 | 205 | 294 | 261 | 235 |
| Evaporation value | 0.78 | 0.53 | 0.7 | 0.85 | 1.05 | 1.55 | 1.38 |

What is claimed is:

1. Diorthosilicic acid esters of the formula $$A(OSi)_2(OR')_6$$

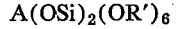

wherein A is a member selected from the group consisting of a pentaerythritol-dipivalic-acid ester and a dipentaerythritol tetra-pivalic-acid ester radical and R' is an alkyl group having more than three carbon atoms, wherein the carboxylic acid constituents of said A groups are derived from saturated monocarboxylic acids having more than two carbon atoms which contain at least one quaternary carbon atom therein.

2. Diorthosilicic acid esters as claimed in claim 1 wherein R' is an alkyl group of at least about 8 carbon atoms.

3. Pentaerythritol - di - pivaloyl - diorthosilicic acid-hexa-isodecyl-ester.

4. Pentaerythritol - di - pivaloyl - diorthosilicic acid-hexa-isononyl-ester.

5. Pentaerythritol - di - pivaloyl - diorthosilicic acid-hexa-isooctyl-ester.

References Cited

UNITED STATES PATENTS 3,444,081  5/1969  Göthel et al. _____ 260—448.8 R

TOBIAS E. LEVOW, Primary Examiner

P. F. SHAVER, Assistant Examiner

U.S. Cl. X.R.

260—448.8 A; 252—41.6